United States Patent [19]
Yamamoto

[11] Patent Number: 5,149,080
[45] Date of Patent: Sep. 22, 1992

[54] VIBRATORY SHEET FEEDER

[75] Inventor: Shinji Yamamoto, Yokohama, Japan

[73] Assignee: Canon Kabushiki Kaisha, Tokyo, Japan

[21] Appl. No.: 740,893

[22] Filed: Aug. 6, 1991

[30] Foreign Application Priority Data

Aug. 7, 1990 [JP] Japan ................................ 2-208993
Sep. 6, 1990 [JP] Japan ................................ 2-236627
Oct. 30, 1990 [JP] Japan ................................ 2-292509

[51] Int. Cl.$^5$ .............................................. B65H 7/02
[52] U.S. Cl. .................................... 271/265; 271/266; 271/267; 271/270; 271/193; 310/323
[58] Field of Search ............... 271/18.1, 18.2, 264, 271/265, 266, 267, 270, 278, 193; 340/674; 310/323

[56] References Cited
U.S. PATENT DOCUMENTS

| | | | |
|---|---|---|---|
| 4,997,177 | 3/1991 | Mori et al. | 271/267 |
| 5,062,622 | 11/1991 | Kataoka et al. | 271/267 |
| 5,071,113 | 12/1991 | Nakamura et al. | 271/193 |
| 5,094,444 | 3/1992 | Seki | 271/278 |

FOREIGN PATENT DOCUMENTS 59-177243 6/1984 Japan .
0209337 8/1990 Japan ................................ 271/265

Primary Examiner—H. Grant Skaggs
Attorney, Agent, or Firm—Fitzpatrick, Cella, Harper & Scinto

[57] ABSTRACT

A vibratory feeder for sheets includes sheet conveying members for holding and conveying the sheet utilizing travelling waves, a sheet feed detection member for detecting a feed of the sheet, and a drive control circuit for applying alternating electrical signal to each of electric/mechanical energy conversion elements on the basis of the sheet feed detection information from the sheet feed detection member. The travelling wave is formed in each of the sheet conveying members by applying the alternating electric signal controlled by the drive control circuit to each of the electric/mechanical energy conversion elements, by which a conveying force is applied to the sheet. The drive control circuit feeds the sheet in the following manners on the basis of the sheet feed detection information from the sheet feed detection member. The sheet is fed first at a fixed high speed until it has been fed to a position close to the desired distance. Thereafter, feeding of the sheet is temporarily suspended, and then the sheet is fed stepwise until it reaches the desired position.

13 Claims, 5 Drawing Sheets

VIBRATORY SHEET FEEDER

BACKGROUND OF THE INVENTION

1. Field of the Invention

The present invention relates to a sheet feeder, and more particularly, to a sheet feeder of the type which utilizes, as a transporting force (a feeding force), travelling vibration waves, and which is employed in various types of machines provided with a sheet feeding mechanism, such as computers, copying machines, facsimiles, word processors, or typewriters.

2. Related Background Art

Various sheet feeding devices of the type which utilize, as a feeding force, travelling vibration waves formed in an elastic member have been proposed. For example, Japanese Patent Laid-Open No. 59-177243 discloses a sheet feeding device which feeds sheets utilizing travelling waves formed in elastic members for holding the sheet.

FIG. 5 illustrates the principle of the sheet feeding operation made by the aforementioned sheet feeding device.

In FIG. 5, a sheet 12 is held under adequate pressure between two elastic members 10 and 11. In the elastic members 10 and 11, travelling flexural vibrations (progressive waves or vibration waves) are formed such that these two progressive waves are spatially out of phase by 180 degrees. Consequently, the flexural vibrations formed in the individual elastic members 10 and 11 propagate with convex portions thereof opposing the sheet 12. At this time, a surface particle 10a of the convex portion on the surface of the elastic member 10 or 11 generally moves in an elliptical form. For example, when the progressive wave propagates in the elastic member 10 in the direction indicated by an arrow 15 to the right, as viewed in FIG. 5, the mass particle 10a moves clockwise in an elliptical form. Therefore, the direction of movement of the surface particle 10a of the convex portion is reversed to propagation of the vibrations in either of the elastic members 10 and 11. This reversed motion acts as the conveying force of the sheet 12.

On the concave portion, the sheet conveying force is generated in the same direction as the direction of propagation of the vibrations. However, since the pressure in the concave portion is smaller than that generated in the convex portion, friction between the sheet 12 and the elastic members 10 and 11 is small, and the sheet conveying force is thus small. As a result, the sheet conveying forces act as a whole in the reverse direction to the direction of propagation of the flexural vibrations.

The sheet feeding device, shown in FIG. 5, which utilizes a vibration wave has an advantage over the sheet feeding device of the type in which a driving force from, for example, a motor is transmitted to a paper feeding roller through a transmission mechanism, such as a gear train, in that transmission loss of the gear train or the like is eliminated. This allows for a highly accurate sheet feeding.

However, the sheet feeding device shown in FIG. 5 suffers from a disadvantage in that a sheet feeding accuracy may deteriorate due to changes in the environment, such as temperature or humidity, or by non-uniform thickness of the sheets. For example, when sheets are fed through a predetermined distance and then feeding is stopped for printing, deterioration in the sheet feeding accuracy may lead to non-uniform printing.

Regarding a high sheet feeding accuracy of the sheet feeding device, it is also essential that the sheet be precisely stopped at a predetermined position.

In the sheet feeding device shown in FIG. 5, a sheet transporting force is eliminated by suspending generation of the travelling wave formed in the elastic members 10 and 11. Consequently, feeding of the sheet is suspended due to friction between the elastic members 10 and 11 and the sheet.

However, when the sheet feeding speed is large, the sheet is stopped beyond the predetermined position due to the inertia force of the sheet.

SUMMARY OF THE INVENTION

An object of the present invention is to provide a sheet feeding device which utilizes, as a transporting force, vibrations, and which is capable of accurately stopping a member to be conveyed, such as a sheet, at a desired position when it is moving at a high speed.

Another object of the present invention is to provide a vibratory sheet feeding device which is capable of accurately stopping a moving sheet at a desired position even when the characteristics of the conveyed sheets, such as the thickness or smoothness of the sheet, change.

Still another object of the present invention is to provide a vibratory sheet feeding device which has a simple structure but is capable of stably and quickly stopping a moving sheet at a desired position with a high degree of accuracy even when the quality of the paper to be conveyed changes.

Other objects and advantages of the invention will become apparent during the following description of embodiments with reference to the accompanying drawings.

In one aspect of the present invention, there is provided a vibratory feeder for sheets which stops application of a voltage from a vibration member exciting power source means or reduces the level of the voltage before the sheet has been fed through a predetermined distance and then applies to the vibration member from the power source means a voltage for conveying the sheet stepwise.

In another aspect of the present invention, there is provided a vibratory feeder for sheets which reduces the level of the voltage applied from the power source means to the vibration member for a predetermined period of time before the sheet has been fed through a predetermined distance, stops application of the voltage from the power source means or reduces the level thereof, and then applies to the vibration member a voltage for conveying the sheet stepwise.

In still another aspect of the present invention, there is provided a vibratory feeder for sheets which comprises sheet conveying members for holding and conveying the sheet utilizing travelling waves; a sheet feed detection member for detecting a feed of the sheet; and a drive control circuit for applying an alternating electrical signal to each of the electrical/mechanical energy conversion elements on the basis of the sheet feed detection information from said sheet feed detection member. The travelling wave is formed in each of the sheet conveying members by applying the alternating electrical signal controlled by the drive control circuit to each of the electrical/ mechanical energy conversion elements, by which a conveying force is applied to the sheet. The drive control circuit feeds the sheet in the following manner on the basis of the sheet feed detection information from the sheet feed detection member. The sheet is fed first at a fixed high speed until it has been fed to a position close to the desired distance. Thereafter, feeding of the sheet is temporarily suspended, and then the sheet is fed stepwise until it reaches the desired position. The drive control circuit determines the alternating electrical signal application conditions during the stepwise feeding operation in accordance with the speed at which the sheet is fed at the fixed high speed.

DETAILED DESCRIPTION OF THE PREFERRED EMBODIMENTS

Figure 1:
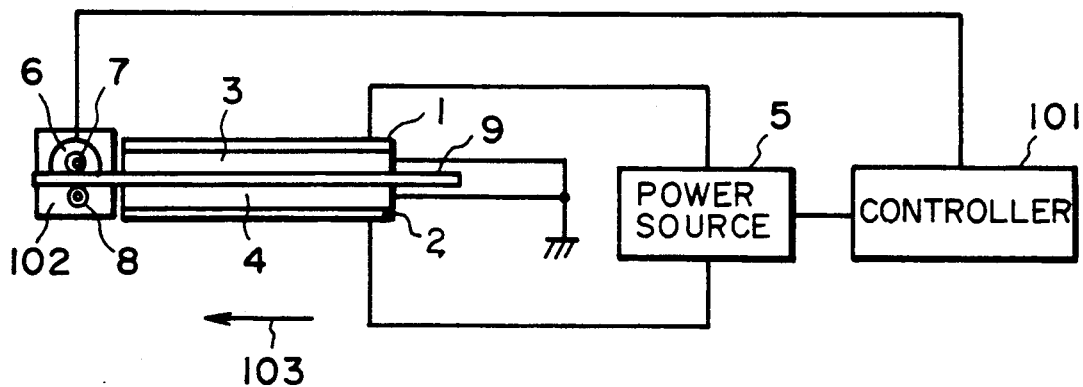
FIG. 1 is a schematic view of the essential parts of a first embodiment of the present invention.

FIG. 1 is a schematic view of the essential parts of a first embodiment of the present invention. A sheet 9, which is a member to be conveyed (a member to be transported), is held between elastic members 3 and 4 under adequate pressure. Electrical/mechanical energy conversion elements 1 and 2, comprising a piezoelectric element, a piezoelectric ceramic, a polymeric piezoelectric element or a magnetostrictive element, are fixed to the surfaces of the elastic members 3 and 4 which are remote from the sheet 9 using an adhesive or the like.

In this embodiment, the material of the elastic members is selected from among various metal materials, plastics and rubbers, in accordance with the characteristic frequency or coefficient of the elasticity of the conversion elements 1 and 2.

A power source means 5 has an oscillator to apply alternating electric signals to the conversion elements 1 and 2. A control means 101 controls the magnitude of the amplitude of the alternating electric signals applied from the power source means 5 to the conversion elements 1 and 2 as well as on/off of the application of the alternating electric signals on the basis of the output signal of a feed detection means 102 which will be described later.

The feed detection means 102, comprising a rotary encoder or a linear encoder, detects the amount at which the sheet is fed. In the configuration shown in FIG. 1, the feed of the sheet 9 is obtained by detecting the rotation of a roller 7 which rotates in accordance with the feed of the sheet 9 by a rotary encoder 6.

The operation of the first embodiment will now be described.

Figure 5:
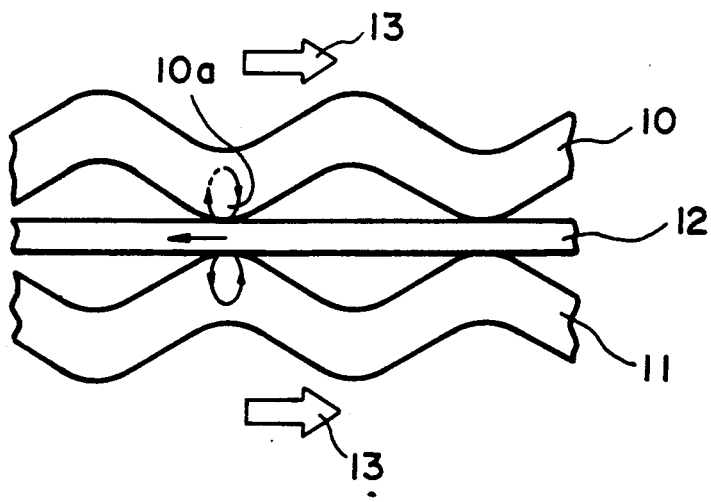
FIG. 5 illustrates the principle of the operation of a conventional sheet feeding device which utilizes a traveling wave.

When alternating electric signals having predetermined frequencies and a phase difference are applied from the power source means 5 to the known conversion elements 1 and 2, travelling waves are generated in the individual elastic members 3 and 4 by the known process. Consequently, the sheet 9 is fed in the direction indicated by the arrow 103 on the basis of the same transportation principle as that illustrated in FIG. 5. During the feeding, the feeding speed of the sheet 9 is controlled in accordance with the magnitude of the amplitude of the alternating electric signals applied from the power source means 5 to the conversion elements 1 and 2. The magnitude of the amplitude of the alternating electric signals from the power source means 5 is controlled by the control means 101 on the basis of the feed information from the feed detection means 102. That is, the feed of the sheet 9 is detected by the feed detection means 102, and application of the alternating electric signals from the power source means 5 to the conversion elements 1 and 2 is controlled until the feed of the sheet 9 reaches a desired value, as will be described later.

Figure 2:
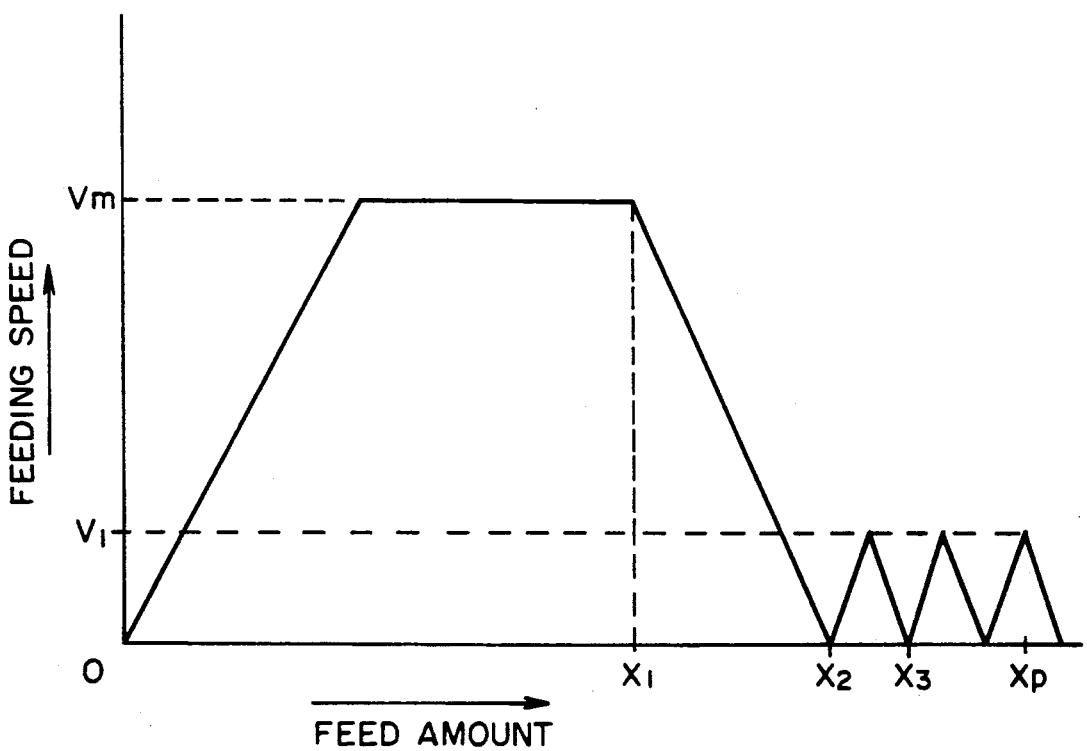
FIG. 2 illustrates the relationship between the sheet feed and the sheet feeding speed in the first embodiment.

FIG. 2 is a graph illustrating how the alternating electric signals applied from the power source means 5 to the conversion elements 1 and 2 are controlled by the control means 101.

In the graph shown in FIG. 2, the ordinate axis represents the sheet feeding speed. The abscissa axis represents the feed of the sheet.

First, alternating electrical signals having a normal amplitude are applied from the power source means 5 to the conversion elements 1 and 2. Consequently, the feed speed of the sheet 9 gradually increases from zero to the maximum speed $V_m$ at a predetermined voltage and then remains at the value $V_m$ for a predetermined period of time. When the control means 101 receives from the feed detection means 102 the feed information indicating that the sheet has been fed to the position represented by the feed $X_1$, which is slightly less than a preset desired value $X_p$, it stops application of the alternating electric signals to the conversion elements 1 and 2 or decreases the amplitude thereof (in this embodiment, the control means stops application of the alternating electric signals, but the sheet may be fed at a low speed).

Thereafter, feeding of the sheet 9 is temporarily stopped. In this embodiment, feeding of the sheet is stopped when the sheet 9 reaches the feed $X_2$ (see FIG. 2). Subsequently, alternating electric signals are applied from the power source means 5 to the conversion means 1 and 2 again to generate the sheet feeding force. This time, when the sheet feeding speed has reached the value $V_1$ which is lower than the maximum speed $V_m$ at the predetermined voltage, application of the signals to the conversion means 1 and 2 is stopped, by means of which the sheet 9 stops at the position represented by the feed $X_3$.

Thereafter, the same operation is repeated to repeat the stepwise conveyance of the sheet from the position represented by the feed $X_3$ to the position represented by the feed $X_p$. Thus, the sheet 9 is conveyed stepwise until it reaches the vicinity (allowable range) of the position represented by the desired feed $X_p$.

Figure 3:
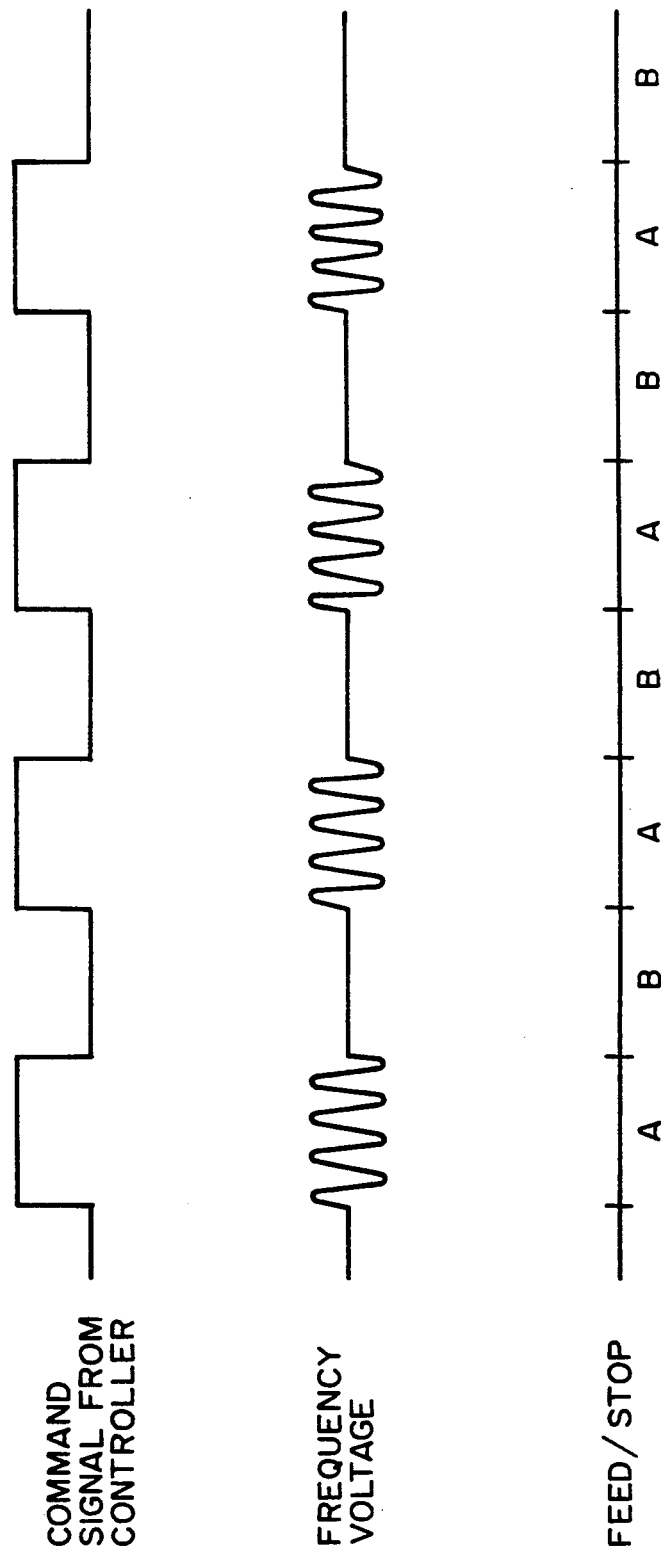
FIG. 3 illustrates the relationship between the alternating electrical signal from a power source means, corresponding to a command signal from a control means, and the sheet feeding periods in the first embodiment.

FIG. 3 illustrates the relationships between the command signal from the control means 101, alternating electrical signals applied from the power source means 5 to the conversion means 1 and 2, and the sheet conveyed and non-conveyed periods, obtained in the sheet stepwise conveying period. In FIG. 3, the period A represents the region in which the sheet 9 is conveyed, and the period B indicates the region in which feeding of the sheet 9 is stopped. The sheet is conveyed stepwise by the repetition of the regions A and B.

In this embodiment, the alternating electrical signals applied from the power source means 5 to the conversion means 1 and 2 are controlled by the control means 101 in the manner shown in FIG. 3 so as to achieve the desired feed value of the sheet.

In this embodiment, in the regions close to the desired sheet feed, the sheet is fed at a speed $V_1$ lower than the maximum speed $V_m$ at the predetermined voltage. In this way, the braking distance required to stop the sheet 9 is reduced, and the sheet positioning accuracy is thus improved.

Furthermore, the feed from feed $X_1$ to feed $X_p$ is made longer than at least the braking distance (from feed $X_1$ to the feed $X_2$) required to stop the sheet which is moving at the maximum speed $V_m$ so as to prevent the sheet from being conveyed beyond the desired feed value.

The shorter the feed from the feed $X_1$ to the feed $X_p$, the shorter the time required to position the sheet at a desired position. Therefore, the position represented by the feed $X_1$ at which application of the alternating electric signals is stopped is determined adequately relative to the desired feed $X_p$.

In this embodiment, application of the alternating electric signals from the power source means is temporarily stopped to temporarily stop conveyance of the sheet. However, the feed speed may be reduced to a value from which a subsequent stepwise convey is started.

In this embodiment, the magnitude of the sheet conveying force is controlled by controlling the magnitude of the amplitude of the voltages applied to the conversion elements which are the vibration generation sources. However, it may also be controlled by changing the phase difference or frequencies of the alternating electrical signals applied to the conversion elements.

Figure 4:
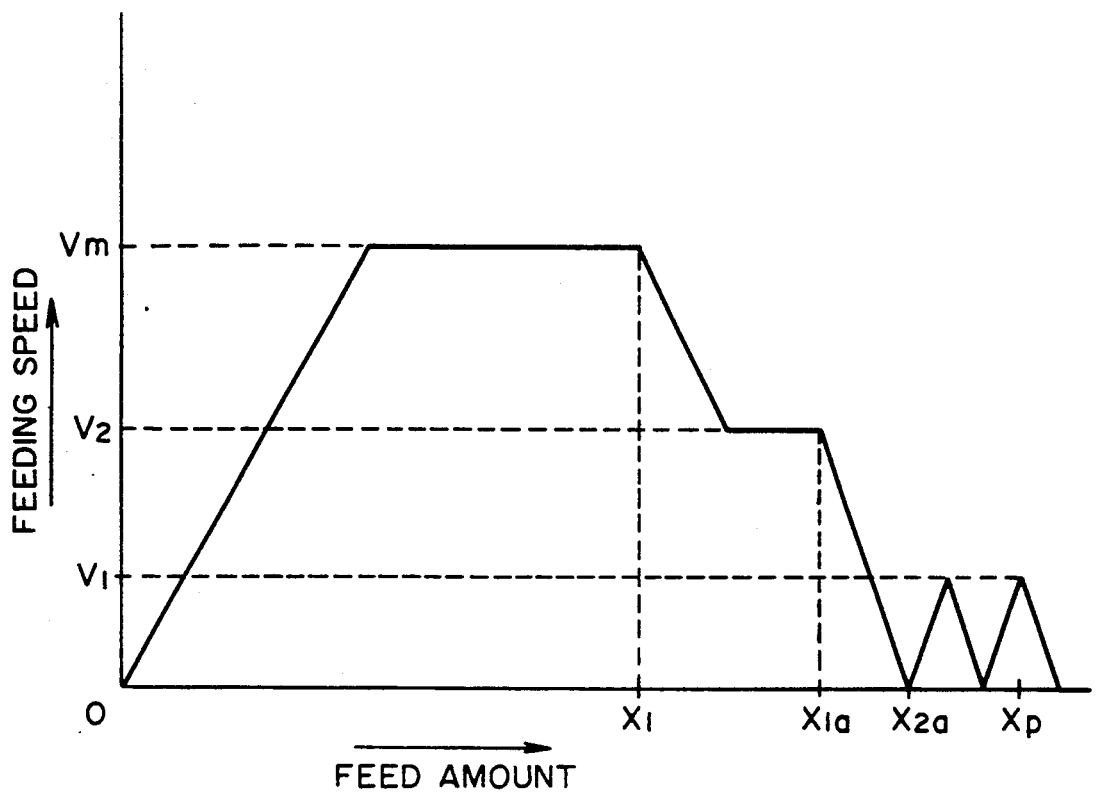
FIG. 4 illustrates the relationship between the sheet feed and the sheet feeding speed in a second embodiment of the present invention.

FIG. 4 illustrates how alternating electrical signals applied from the power source means 5 (see FIG. 1) to the conversion means 1 and 2 (see FIG. 1) are controlled by the control means 101 (see FIG. 1) in a second embodiment of the present invention. FIG. 4 is similar to FIG. 2.

In this embodiment, when the sheet feed speed is to be reduced from the maximum speed $V_m$ at the predetermined voltage to zero, the feeding speed is first reduced to a speed $V_2$ by reducing the level of the applied voltages at the position represented by the feed $X_1$, and the sheet is fed at that speed for a predetermined period of time. When the sheet has been fed to the position represented by the feed $X_{1a}$, the sheet feeding speed is further reduced. The sheet feeding speed reduces to zero by the time the sheet reaches the position represented by the feed $X_{2a}$. Stepwise conveyance of the sheet 9 (see FIG. 1), similar to that performed in the first embodiment, begins at the position $X_{2a}$ to allow the sheet to be conveyed to the position represented by the desired feed $X_p$.

In this embodiment, the sheet conveyance speed is gradually reduced to achieve a reduction in the braking distance (from feed $X_{1a}$ to feed $X_{2a}$) required to stop sheet conveyance or reduce the sheet conveyance speed. Consequently, highly accurate control of the sheet feeding distance is achieved, and the time for feeding the sheet is reduced.

Figure 6:
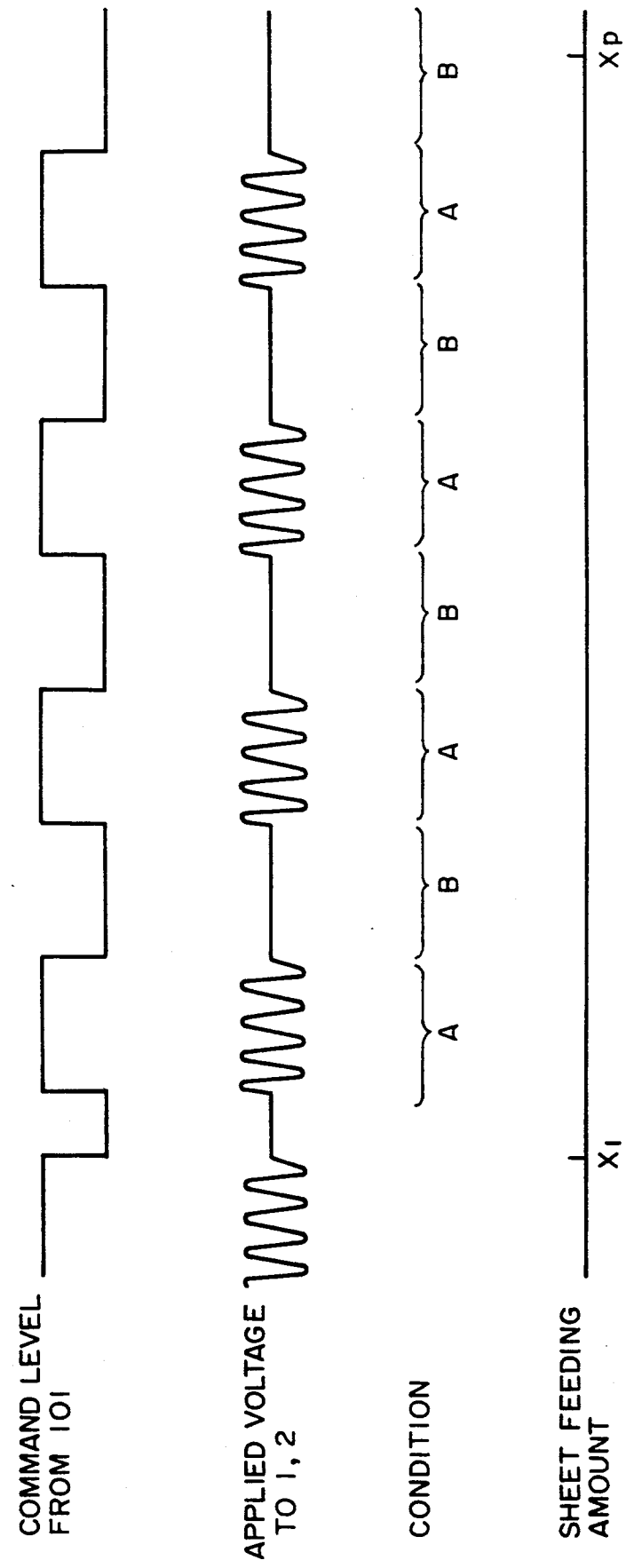
FIG. 6 shows the voltages supplied to conversion elements 1 and 2 in a third embodiment of the present invention.

FIG. 6 illustrates how the alternating electric signals are applied from the feed $X_1$ to the feed $X_p$ (see FIG. 2) in a third embodiment of the present invention. The configuration of this embodiment is the same as that shown in FIG. 1 and the description thereof is omitted.

In FIG. 6, two states of the amplitude of the electrical signals supplied to the conversion elements 1 and 2 are indicated by conditions A and B. Condition B indicates zero amplitude. The sheet 9 is fed through a small distance in each period of condition A.

The feed of the sheet 9 is detected by the rotary encoder 6 which is the feed detection means. When the sheet 9 has been fed through a predetermined distance, the control means 101 stops generation of vibrations so as to stop the sheet 9 at a predetermined position.

In other words, the control means 101 counts the number of pulses from the rotary encoder 6, and reduces the amplitude to zero when the number of pulses has reached a predetermined value to stop generation of vibrations in the elastic members 3 and 4 and thereby stop the sheet 9 at a desired position.

During the sheet feeding operation, alternating electrical signals are continuously applied to the conversion means 1 and 2 until the sheet reaches the position represented by the feed $X_1$, as shown in FIG. 6, so as to continuously vibrate the elastic members 3 and 4 for holding the sheet 9. Beyond the feed $X_1$, a driving force is applied to the sheet 9 in each period of condition A to feed the sheet 9. In each period of condition B, the driving force to the sheet is reduced to zero. Therefore, the sheet 9 is fed stepwise, and the sheet feeding speed is thus reduced immediately before feeding of the sheet is stopped. Consequently, feeding of the sheet beyond a desired feeding position due to the inertial force can be reduced, and the sheet positioning accuracy can thus be improved.

Figure 7:
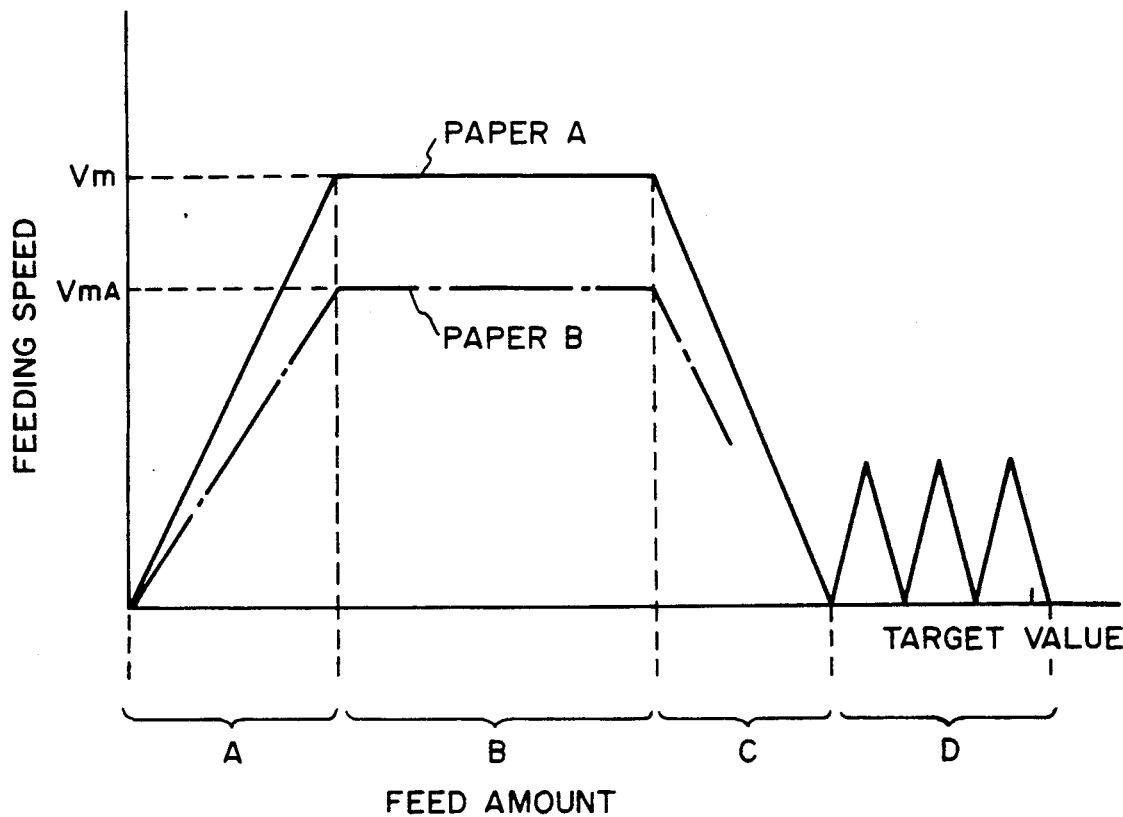
FIG. 7 illustrates the relationship between the sheet feed and the sheet feeding speed in a fourth embodiment of the present invention.
Figure 8:
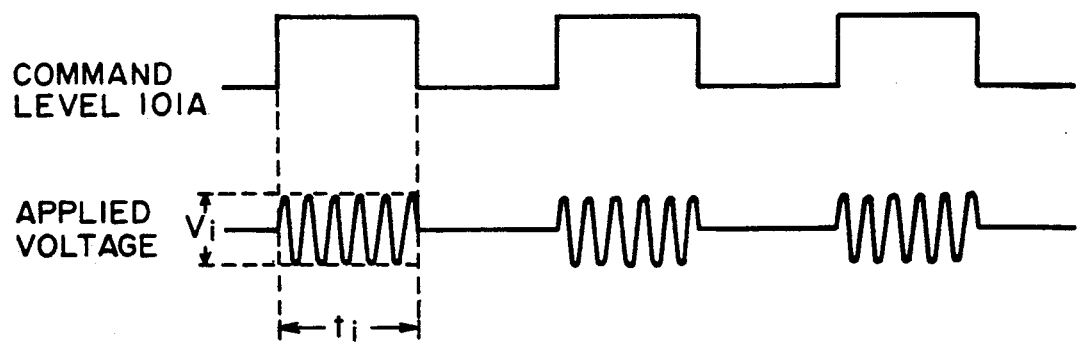
FIG. 8 shows a control signal from a control circuit of the vibratory sheet feeder shown in FIG. 7 and the voltages supplied to the conversion elements.

FIG. 7 shows the sheet feeding speed characteristics of a fourth embodiment of the present invention. FIG. 8 shows the waveforms of the voltages applied to the conversion elements 1 and 2. The configuration of this embodiment is also the same as that shown in FIG. 1 except for the control circuit, description thereof being omitted. Although connections of a control circuit 101A (not shown) to other elements in the embodiment shown in FIG. 7 are the same as those of the control circuit 101 shown in FIG. 1, the control circuit 101A differs from the control circuit 101 in that it employs the electrical signal output from the rotary encoder 6 not only as a signal for determining the feed of the sheet 9 but also as a signal for determining the sheet feeding speed.

Generally, when the quality of the sheet 9 changes, the sheet feeding speed characteristics change, as shown by solid and alternating long and short dashed lines shown in FIG. 7. With the sheet qualities indicated by the solid and the alternating long and short dash lines shown in FIG. 7, the distance through which the sheet 9 is fed in a single step (by a single energization) of the stepwise feeding operation indicated by a state D (see FIG. 7) changes. Since the positioning accuracy in the driving method shown in FIG. 1 is dependent on the distance through which the sheet 9 is fed in a single step of the stepwise feeding operation, it must be made stable.

In the fourth embodiment shown in FIGS. 7 and 8, the alternating electrical signals application conditions are determined in accordance with the sheet feeding speed $V_m$ in a state B (see FIG. 7) in order to further enhance the positioning accuracy.

FIG. 8 shows the waveforms of the command of the control circuit 101AA and the voltages applied from the power source means 5 (see FIG. 1) in the state D. The variable t. represents the period in which the level of the output of the control circuit 101A is high, and $V_i$ represents the amplitude of the voltage applied when the level of the output of the control circuit 101A is high.

When the sheet feeding speed in the state B is slow due to the quality of the sheet 9, the feed of the sheet in the stepwise feeding operation (state D) is reduced, if the amplitude of the voltages applied to the conversion elements 1 and 2 is the same. Therefore, the sheet driving force is increased by increasing the time $t_i$ or the amplitude $V_i$ of the applied voltage. When the sheet feeding speed in the state B is fast due to the quality of the sheet, the sheet driving force is reduced by reducing the time t: or the amplitude $V_i$ of the applied voltage. In this embodiment, either of $t_i$ or $V_i$ is changed to change the sheet driving force. However, both $t_i$ or $V_i$ may be changed.

When the amplitude of the applied voltage is to be changed, a control signal for changing the amplitude is supplied from the control circuit 101A to the power source circuit 5. The power source circuit 5 supplies voltages corresponding to this control signal to the conversion elements 1 and 2.

In this embodiment, the sheet driving force in the state D is changed in accordance with the sheet feeding speed in the state B shown in FIG. 7, i.e., during the high speed feeding operation. However, the driving force may also be changed in accordance with the sheet feeding state detected in a state A shown in FIG. 7. More specifically, the time (T) required for the sheet feeding speed to reach a predetermined value from zero after the sheet feeding operation is activated is measured. When the time (T) is long, the driving force is increased by increasing $t_i$ or $V_i$ shown in FIG. 8. Conversely, when the time (T) is short, the driving force is reduced by reducing $t_i$ or $V_i$.

The driving force is changed in accordance with the rising characteristics of the sheet feeding speed (state A). However, the driving force may be changed in accordance with the lowering characteristics of the sheet feeding speed (state C).

As will be understood from the foregoing description, it is possible according to the present invention to stop a moving sheet at a desired position.

What is claimed is:

1. A vibratory feeder for a sheet comprising:
a vibration member brought into frictional contact with the sheet to be fed, said vibration member generating a travelling wave for feeding the sheet in response to an electrical signal applied thereto; and
a control member operationally connected to said vibration member for controlling the travelling wave, said control member-generating a first travelling wave controlling state in which the sheet is fed at a first- speed and a second travelling wave-controlling state in which the sheet is fed at a second speed slower than the first speed, said second travelling wave controlling state being achieved when the sheet has been fed through a predetermined distance.

2. The vibratory feeder according to claim 1, wherein said second travelling wave controlling state comprises a state in which the travelling wave is generated intermittently.

3. The vibratory feeder according to claim 1, wherein said first travelling wave controlling state comprises a state in which the travelling wave is generated continuously.

4. The vibratory feeder according to claim 1, wherein said second travelling wave controlling state comprises a state in which the travelling wave is generated stepwise.

5. The vibratory feeder according to claim 1, wherein said control member generates a first control signal for generating the travelling wave having a predetermined amplitude, and a second control signal for generating the travelling wave having an amplitude smaller than that of the predetermined amplitude, said second control signal being generated when the sheet has been fed through a predetermined distance.

6. A vibratory feeder for a sheet comprising:
a vibration member brought into frictional contact with the sheet to be fed, said vibration member generating vibrations for feeding the sheet in response to an electrical signal applied thereto; and
a control member operationally connected to said vibration member for controlling the vibrations, said control member generating a first vibration controlling state in which the sheet is fed at a first speed and a second vibration controlling state in which the sheet is fed at a second speed slower than the first speed, said second vibration controlling state being achieved when the sheet has been fed through a predetermined distance.

7. The vibratory feeder according to claim 6, wherein said second vibration controlling state comprises a state in which the vibrations are generated intermittently.

8. The vibratory feeder according to claim 6, wherein said first vibration controlling state comprises a state in which the vibrations are generated continuously.

9. The vibratory feeder according to claim 6, wherein said second vibration controlling state comprises a state in which the vibrations are generated stepwise.

10. The vibratory feeder according to claim 6, wherein said control member generates a first control signal for generating the vibrations having a predetermined amplitude, and a second control signal for generating the vibrations having an amplitude smaller than that of the predetermined amplitude, said second control signal being generated when the sheet has been fed through a predetermined distance.

11. A vibratory feeder for a sheet comprising:
a vibration member brought into frictional contact with the sheet to be fed, said vibration member generating a travelling wave for feeding the sheet in response to an electrical signal applied thereto; and
a control member operationally connected to said vibration member for continuously supplying to said vibration member an alternating signal and for intermittently supplying to said vibration member an alternating signal after the sheet has been fed through a predetermined distance.

12. A vibratory feeder for a sheet comprising:
a vibration member brought into frictional contact with the sheet to be fed, said vibration member generating a travelling wave for feeding the sheet in response to an electrical signal applied thereto;
detection means for generating an output signal representing the feeding state of the sheet; and
a control member operationally connected to said vibration member for controlling the travelling wave, said control member generating a first travelling wave controlling state in which the sheet is fed at a first speed and a second travelling wave controlling state in which the sheet is fed at a second speed slower than the first speed, said second speed corresponding to the output signal from said detection means, said second travelling wave controlling state being achieved when the sheet has been fed through a predetermined distance.

13. The vibratory feeder according to claim 12, wherein said second travelling wave controlling state comprises a state in which the travelling wave is generated intermittently.

* * * * *

UNITED STATES PATENT AND TRADEMARK OFFICE
CERTIFICATE OF CORRECTION

PATENT NO. : 5,149,080
DATED : September 22, 1992
INVENTOR(S) : SHINJI YAMAMOTO

It is certified that error appears in the above-identified patent and that said Letters Patent is hereby corrected as shown below:

On the Title page, item [57]

[57] ABSTRACT

Line 5, "of elec -" should read --of the elec---.

Line 6, "tric/mechanical" should read --trical/mechanical--.

Line 11, "electric/mechanical" should read --electrical/mechanical--.

Line 14, "manners" should read --manner--.

COLUMN 3

Line 59, "electric" should read --electrical--.

Line 61, "electric" should read --electrical--.

Line 64, "electric" should read --electrical--.

COLUMN 4

Line 7, "electric" should read --electrical--.

Line 17, "electric" should read --electrical--.

Line 20, "electric" should read --electrical--.

Line 50, "electric" should read --electrical--.

UNITED STATES PATENT AND TRADEMARK OFFICE
CERTIFICATE OF CORRECTION

PATENT NO. : 5,149,080

DATED : September 22, 1992

INVENTOR(S) : SHINJI YAMAMOTO

It is certified that error appears in the above-identified patent and that said Letters Patent is hereby corrected as shown below:

COLUMN 6

Line 8, "electric" should read --electrical--.

COLUMN 7

Line 12, "t." should read --$t_i$--.

Line 68, "first-" should read --first--; and "wave-" should read --wave--.

Signed and Sealed this

Nineteenth Day of October, 1993

Attest:

BRUCE LEHMAN

Attesting Officer

Commissioner of Patents and Trademarks